United States Patent
Yoshimura et al.

(10) Patent No.: US 12,080,489 B2
(45) Date of Patent: Sep. 3, 2024

(54) ELECTRODE FOIL FOR ELECTROLYTIC CAPACITOR, ELECTROLYTIC CAPACITOR, AND METHODS FOR PRODUCING THEM

(71) Applicant: PANASONIC INTELLECTUAL PROPERTY MANAGEMENT CO., LTD., Osaka (JP)

(72) Inventors: Mitsuhisa Yoshimura, Osaka (JP); Shosuke Nakano, Osaka (JP); Hiroshi Yoshida, Kyoto (JP); Masami Tsubaki, Kyoto (JP); Naomi Kurihara, Osaka (JP); Miwa Ogawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 448 days.

(21) Appl. No.: 17/434,263

(22) PCT Filed: Oct. 30, 2019

(86) PCT No.: PCT/JP2019/042681
§ 371 (c)(1),
(2) Date: Aug. 26, 2021

(87) PCT Pub. No.: WO2020/174751
PCT Pub. Date: Sep. 3, 2020

(65) Prior Publication Data
US 2022/0148815 A1    May 12, 2022

(30) Foreign Application Priority Data
Feb. 28, 2019    (JP) .................. 2019-037029

(51) Int. Cl.
H01G 9/055    (2006.01)
H01G 9/00    (2006.01)
H01G 9/145    (2006.01)

(52) U.S. Cl.
CPC .......... *H01G 9/055* (2013.01); *H01G 9/0032* (2013.01); *H01G 9/145* (2013.01)

(58) Field of Classification Search
None
See application file for complete search history.

(56) References Cited

U.S. PATENT DOCUMENTS 5,503,718 A    4/1996 Kakizakai
2006/0180474 A1    8/2006 Fujimoto et al.
(Continued)

FOREIGN PATENT DOCUMENTS

CN    102013334 A    4/2011
CN    108074738 A    5/2018
(Continued)

OTHER PUBLICATIONS

Translation JP 2007258288 (Year: 2007).*
(Continued)

*Primary Examiner* — Eric W Thomas
(74) *Attorney, Agent, or Firm* — Rimon P.C.

(57) ABSTRACT

An electrode foil for an electrolytic capacitor including a metal porous portion, and a metal core portion continuous to the metal porous portion. When the metal porous portion is equally divided in three in a thickness direction of the metal porous portion into a first region, a second region, and a third region sequentially from the metal core portion side, the first region has a porosity P1, the second region has a porosity P2, and the third region has a porosity P3, satisfying P1<P2<P3.

24 Claims, 10 Drawing Sheets

(56) References Cited

U.S. PATENT DOCUMENTS

| | | | |
|---|---|---|---|
| 2018/0137990 A1 | 5/2018 | Saito | |
| 2018/0158611 A1 | 6/2018 | Arakawa et al. | |
| 2018/0358181 A1* | 12/2018 | Ogawa | C25D 11/10 |
| 2020/0135410 A1* | 4/2020 | Horio | B22F 5/006 |

FOREIGN PATENT DOCUMENTS

| | | | | |
|---|---|---|---|---|
| JP | H07-249550 A | | 9/1995 | |
| JP | 2005-203529 A | | 7/2005 | |
| JP | 2006-222333 A | | 8/2006 | |
| JP | 2007115949 A | * | 5/2007 | |
| JP | 2007258288 A | * | 10/2007 | |
| JP | 2015-115475 A | | 6/2015 | |
| WO | 2017/26247 A1 | | 2/2017 | |
| WO | WO-2017154461 A1 | * | 9/2017 | ......... C23C 16/0227 |

OTHER PUBLICATIONS

Translation JP 2007115949 (Year: 2007).*
Chinese Office Action with English Translation of Search Report dated Dec. 1, 2022 issued in the corresponding Chinese Patent Application No. 201980093217.2.
Japanese Office Action dated Oct. 24, 2023 issued in the corresponding Japanese Patent Application No. 2021-501554.
Isaya Nagata; Aluminum Electrolytic Capacitor with Liquid Electrolyte Cathod; Feb. 24, 1997 (H9) 2nd edition 1st printing published; Japan Capacitor Industry Co., Ltd.; p. 232.
International Search Report and Written Opinion issued in International Patent Application No. PCT/JP2019/042681, dated Jan. 21, 2020; with partial English translation.

* cited by examiner

ELECTRODE FOIL FOR ELECTROLYTIC CAPACITOR, ELECTROLYTIC CAPACITOR, AND METHODS FOR PRODUCING THEM

CROSS-REFERENCE OF RELATED APPLICATIONS

This application is the U.S. National Phase under 35 U.S.C. § 371 of International Patent Application No. PCT/JP2019/042681, filed on Oct. 30, 2019, which in turn claims the benefit of Japanese Application No. 2019-037029, filed on Feb. 28, 2019, the entire disclosures of which Applications are incorporated by reference herein.

TECHNICAL FIELD

The present invention relates to an electrode foil for an electrolytic capacitor, an electrolytic capacitor, and methods for producing them.

BACKGROUND ART

An electrolytic capacitor includes an anode body made of, for example, a metal foil containing a valve action metal. To increase the capacitance of the electrolytic capacitor, etching is applied to a principal surface of the metal foil, to form a metal porous portion. The metal foil is then subjected to chemical formation, so that a metal oxide (dielectric) layer is formed on the surface of a metal skeleton (metal part) constituting the metal porous portion.

Patent Document 1 discloses an electrode foil production method including etching an aluminum foil by applying an AC current thereto, in an aqueous solution mainly composed of hydrochloric acid and containing at least one of sulfuric acid, oxalic acid, and phosphoric acid. The current density step during the AC current application is controlled such that the current density, which is taken as maximum at the beginning of the etching treatment, is reduced gradually from the maximum, and forced to be zero before the current density drops to zero.

Patent Literature 2 discloses forming a dielectric layer by an atomic layer deposition method.

CITATION LIST

Patent Literature

[PTL 1] Japanese Laid-Open Patent Publication No. 2005-203529
[PTL 2] PCT Publication No. WO 2017/26247

SUMMARY OF INVENTION

Technical Problem

Patent Literature 1 aims to increase the capacitance of an electrode foil for an aluminum electrolytic capacitor by efficiently enlarging the surface area of the aluminum foil. According to the above method of enlarging the surface area, however, further increase in capacitance cannot be expected.

In the case of forming a dielectric layer by an atomic layer deposition method, for example, the source gas of the dielectric layer may fail to reach deep into the etched pits, and it may be difficult to form the dielectric layer in a deep portion of the metal porous portion. In particular, when the porosity of the surface layer of the etched pits, especially a region one-third from the surface, is smaller than that of the portion deeper than this, the reach of the source gas to the deep portion is extremely difficult, which may result in a failure of forming a sufficient dielectric layer in the deep portion.

Solution to Problem

One aspect of the present invention relates to an electrode foil for an electrolytic capacitor, including: a metal porous portion; and a metal core portion continuous to the metal porous portion, wherein when the metal porous portion is equally divided in three in a thickness direction of the metal porous portion into a first region, a second region, and a third region sequentially from the metal core portion side, the first region has a porosity P1, the second region has a porosity P2, and the third region has a porosity P3, satisfying $P1<P2<P3$.

Another aspect of the present invention relates to a method for producing an electrode foil for an electrolytic capacitor, the method including: a process of preparing a metal foil; and a roughening process of surface-roughening the metal foil, to form a metal porous portion, the roughening process including an etching process of applying an electric current to the metal foil, the etching process having: a first electrolysis step of applying an electric current of a first current density to the metal foil in a first processing solution, to obtain a first etched foil; a second electrolysis step of applying an electric current of a second current density to the first etched foil in a second processing solution after the first electrolysis step, to obtain a second etched foil; a third electrolysis step of apply an electric current of a third current density to the second etched foil in a third processing solution after the second electrolysis step, to obtain a third etched foil; a first washing step of washing the first etched foil, after the first electrolysis step and before the second electrolysis step; and a second washing step of washing the second etched foil, after the second electrolysis step and before the third electrolysis step, wherein the first current density> the second current density> the third current density.

Yet another aspect of the present invention relates to an electrode foil for an electrolytic capacitor, including: an anode body having a metal porous portion, and a metal core portion continuous to the metal porous portion; and a dielectric layer covering a surface of a metal skeleton constituting the metal porous portion, wherein the dielectric layer has a first layer of a thickness T1 containing an oxide of a second metal different from a first metal contained in the metal part, and when the metal porous portion is equally divided in three in a thickness direction of the metal porous portion into a first region, a second region, and a third region sequentially from the metal core portion side, the first region has a porosity P1, the second region has a porosity P2, and the third region has a porosity P3, satisfying $P1<P2<P3$.

Yet another aspect of the present invention relates to an electrode foil for an electrolytic capacitor, including: an anode body having a metal porous portion, and a metal core portion continuous to the metal porous portion; and a dielectric layer covering at least part of a surface of a metal part constituting the metal porous portion, wherein when the metal porous portion having the dielectric layer is equally divided in three in a thickness direction of the metal porous portion into a first region, a second region, and a third region sequentially from the metal core portion side, the first region has a porosity Q1, the second region has a porosity Q2, and the third region has a porosity Q3, satisfying $Q1<Q2<Q3$.

Yet another aspect of the present invention relates to a method for producing an electrode foil for an electrolytic capacitor, the method including processes of: preparing an anode body having a metal porous portion, and a metal core portion continuous to the metal porous portion; and forming a dielectric layer covering a surface of a metal part constituting the metal porous portion, wherein when the metal porous portion is equally divided in three in a thickness direction of the metal porous portion into a first region, a second region, and a third region sequentially from the metal core portion side, the first region has a porosity P1, the second region has a porosity P2, and the third region has a porosity P3, satisfying P1<P2<P3, and the process of forming a dielectric layer includes depositing an oxide of a second metal different from a first metal contained in the metal part, on a surface of the metal porous portion by a gas-phase method, to form a first layer of a thickness T1.

Yet another aspect of the present invention relates to an electrolytic capacitor, including: the aforementioned electrode foil for an electrolytic capacitor; and a cathode section covering at least part of the dielectric layer.

Yet another aspect of the present invention relates to a method for producing an electrolytic capacitor, the method including: the processes included in the aforementioned method for producing an electrode foil for an electrolytic capacitor; and a process of forming a cathode section covering at least part of the dielectric layer.

Advantageous Effects of Invention

According to the present invention, when a dielectric layer is formed, a favorable dielectric layer can be formed even in the deep portion of the metal porous portion. Therefore, a high-performance electrode foil for an electrolytic capacitor can be obtained.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
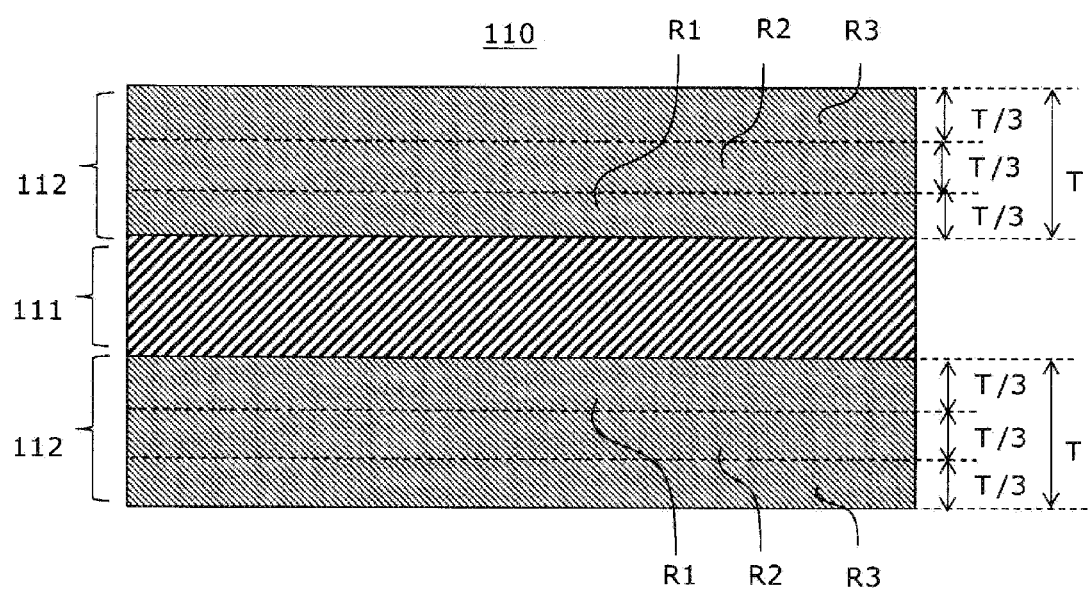
FIG. 1 A schematic cross-sectional view of an anode body according to one embodiment of the present invention.

In the following, an electrode foil for an electrolytic capacitor before forming a dielectric layer is sometimes referred to as a "first electrode foil" or an "anode body", and an electrode foil for an electrolytic capacitor having a dielectric layer is sometimes referred to as a "second electrode foil." In the following, a first etched foil, a second etched foil, and a third etched foil may be each simply referred to as a "metal foil", without any particular distinction from the metal foil.

An electrode foil for an electrolytic capacitor (first electrode foil) according to the present embodiment includes a metal porous portion and a metal core portion continuous to the metal porous portion. That is, the first electrode foil is an integrally formed body of the metal core portion and the metal porous portion. The first electrode foil can be used as an anode body of an electrolytic capacitor.

The second electrode foil has a first electrode foil (or anode body) and a dielectric layer covering at least part of the surface of a metal part constituting the metal porous portion of the first electrode foil. That is, the second electrode foil includes a metal porous portion, a metal core portion continuous to the metal porous portion, and a dielectric layer covering a surface of a metal part (metal skeleton) constituting the metal porous portion. The dielectric layer covers a surface of a metal part (metal skeleton) constituting the metal porous portion. The configuration of the dielectric layer is not limited.

The first electrode foil (or anode body) can be obtained by, for example, partially applying etching or the like to a metal foil formed of a first metal contained in the metal part constituting the metal porous portion, thereby to surface-roughen the metal foil. The metal porous portion is a surface-side (outer) portion of the metal foil having made porous by etching, and the rest portion, which is an inner portion of the metal foil, is a metal core portion.

When the metal porous portion of the first electrode foil is equally divided in three in the thickness direction of the metal porous portion into a first region, a second region, and a third region sequentially from the metal core portion side, the first region has a porosity P1, the second region has a porosity P2, and the third region has a porosity P3, satisfying P1<P2<P3.

When the metal porous portion of the second electrode foil is equally divided in three in the thickness direction of the metal porous portion into a first region, a second region, and a third region sequentially from the metal core portion side, the first region has a porosity P1, the second region has a porosity P2, and the third region has a porosity P3, satisfying P1<P2<P3.

In the second electrode foil, although differing depending on the rated voltage of the electrolytic capacitor, the dielectric layer has a thickness of 4 nm to 300 nm, and is formed relatively thin along the surface contour of the metal part. Therefore, the porosities Q1 to Q3 of the first to third regions in the second electrode foil with the dielectric layer formed thereon is smaller than the P1 to P3 in the first electrode foil before forming the dielectric layer, by the thickness of the dielectric layer.

When P1<P2<P3, the porosity in the second electrode foil also satisfies Q1<Q2<Q3. That is, when the metal porous portion having the dielectric layer is equally divided in three in the thickness direction of the metal porous portion of the second electrode foil into a first region, a second region, and a third region sequentially from the metal core portion side, the first region has a porosity Q1, the second region has a porosity Q2, and the third region has a porosity Q3, satisfying Q1<Q2<Q3.

Conversely, when Q1<Q2<Q3, the porosity of the metal porous portion also satisfies P1<P2<P3.

In the first electrode foil, the porosity of the metal porous portion is made larger as it nears the surface side of the first electrode foil. Therefore, a favorable dielectric layer can be formed even in the deep portion of the metal porous portion, and thus, a high-performance electrode foil for an electrolytic capacitor can be obtained. In an electrolytic capacitor including an electrolytic solution, a solid electrolyte or the like, as a cathode material, the electrolytic solution permeability into the metal porous portion and the packability of the solid electrolyte (e.g., conductive polymer) become favorable, and the capacitance achievement rate of the electrolytic capacitor can be increased, and this acts advantageously on the reduction of ESR and the suppression of leakage current.

Next, an electrolytic capacitor according to the present embodiment includes a second electrode foil and a cathode section covering at least part of the dielectric layer.

In the second electrode foil having the dielectric layer, too, the porosity of the metal porous portion having the dielectric layer is made larger as it nears the surface side of the second electrode foil. Therefore, in an electrolytic capacitor including an electrolytic solution, a solid electrolyte or the like, as a cathode material, the electrolytic solution permeability into the metal porous portion and the packability of the solid electrolyte become favorable, and the capacitance achievement rate of the electrolytic capacitor can be improved, and this acts advantageously on the reduction of ESR and the suppression of leakage current.

The cathode section may include a conductive polymer as the solid electrolyte. When P1<P2<P3 or Q1<Q2<Q3, the conductive polymer can be easily impregnated into the first region.

The cathode section may include an electrolytic solution. When P1<P2<P3 or Q1<Q2<Q3, the electrolytic solution can be easily impregnated into the first region.

A detailed description will be given below of an example of the dielectric layer.

The metal porous portion has pits or pores surrounded by a metal part containing a first metal. The dielectric layer is provided so as to cover at least part of the surface of the metal part surrounding the pits or pores.

The dielectric layer may include an oxide of the first metal contained in the metal part. The dielectric layer may have a first layer of a thickness T1 containing an oxide of a second metal different from the first metal contained in the metal part. When an oxide of a second metal different from the first metal is included in the dielectric layer, for example, the second metal may be any metal having a high dielectric, without restricted by the first metal. Therefore, the capacitance of the electrolytic capacitor can be easily improved. Furthermore, since the second metal can be selected from a wide range of choices, various functions can be imparted to the dielectric layer, without restricted by the first metal.

When the metal porous portion of the first electrode foil is equally divided in three in the thickness direction of the metal porous portion into a first region, a second region, and a third region sequentially from the metal core portion side, the first region has a porosity P1, the second region has a porosity P2, and the third region has a porosity P3, satisfying P1<P2<P3. In other words, the porosity of the metal porous portion increases as it nears the surface side of the anode body. Therefore, when the dielectric layer is formed by a vapor phase method, such as an atomic layer deposition method, the dielectric layer source gas can easily diffuse deep into the metal porous portion, and a favorable dielectric layer can be formed even in the deep portion of the metal porous portion. For example, in the early stage of the growth of the dielectric layer, an oxide of the second metal oxide may preferentially deposit at the surface layer portion (i.e., the third region) of the metal porous portion. Even in this case, when P1<P2<P3, since the porosity P3 of the surface layer portion is large, the entrance to the pits is unlikely to be blocked by the dielectric layer. Therefore, the growth of the dielectric layer can proceeds favorably. Thus, a higher capacity of the electrode foil can be achieved. Also, the electrolytic solution permeability into the metal porous portion and the packability of the solid electrolyte (e.g., conductive polymer) become favorable, and the capacitance achievement rate of the electrolytic capacitor can be increased, and this acts advantageously on the reduction of ESR and the suppression of leakage current.

In a vapor phase method, the source gas is consumed first at the surface layer portion (third region) of the etched pits, resulting in a reduced amount of the source gas reaching to the deepest portion (first region). However, when the porosity P3 of the third region is larger than the porosities P1 and P2 in the portions deeper than this, the entry of the source gas into the etched pits is facilitated. Also, when the porosity P1 of the deepest portion (first region) is small, the surface area of the deepest portion is also small, and therefore, a small amount of the source gas will suffice to form the dielectric layer. Thus, a favorable dielectric layer can be efficiently formed even in the deepest portion of the etched pits. For example, even in sponge-like etched pits whose specific surface area is 50 times or more larger, the dielectric layer can be easily formed in the deepest portion thereof.

In the deep portion (e.g., the first region) of the metal porous portion, the porosity is relatively small, and the pit diameter (or pore diameter) of the etched pits is relatively small. In other words, a large number of fine pores are present in the deep portion of the metal porous portion, ensuring a considerably large surface area. Therefore, even when the surface area in the vicinity of the surface (e.g., in the third region) of the anode body is relatively small, a sufficiently large capacitance can be easily ensured.

The porosity of the metal porous portion can be measured as follows.

First, the anode body is cut so as to obtain a cross-section of the metal core portion and the metal porous portion of the anode body (first electrode foil) in their thickness direction, and an electron micrograph of the cross-section is photographed. Next, the image of the cross-section is binarized to distinguish between the metal part and the voids. Next, the image is divided into a plurality of areas (e.g., at 0.1 μm intervals) from the surface side toward the metal core portion side of the anode body, along a path parallel to the thickness direction of the anode body, and an average of the porosities in each area thus divided is calculated as a porosity. Using the calculated values, a graph showing a relationship between the distance from the surface of the anode body and the porosity can be drawn (see FIGS. 7 to 9). In each of the first, second, and third regions, a plurality of the porosities are extracted randomly at equal intervals, to calculate an average of the porosities, which can be determined as the porosity P1, the porosity P2, and the porosity P3. The porosity Q1, the porosity Q2, and the porosity Q3 of the second electrode foil having the dielectric layer can be similarly measured.

The P2 and P3 may satisfy $1.1 \cdot P2 \leq P3$, and may satisfy $1.2 \cdot P2 \leq P3$. The P1 and P2 may satisfy $1.05 \cdot P1 \leq P2$, and may satisfy $1.1 \cdot P1 \leq P2$.

The Q2 and Q3, although depending on the thickness of the dielectric layer or the rated voltage of the electrolytic capacitor, may satisfy $1.1 \cdot Q2 \leq Q3$, and may satisfy $1.2 \cdot Q2 \leq Q3$. The Q1 and Q2 may satisfy $1.05 \cdot Q1 \leq Q2$, and may satisfy $1.1 \cdot Q1 \leq Q2$.

FIG. 1 is a schematic cross-sectional view of an anode body (first electrode foil) according to one embodiment of the present invention. An anode body 110 is an integrally formed body of a metal core portion 111 and metal porous portions 112, and the thickness of each metal porous portion 112 is denoted by T. As illustrated, the metal porous portion 112 can be equally divided in three, sequentially from the metal core portion 111 side, into a first region R1, a second region R2, and a third region R3 each having a thickness of T/3. In calculating the porosities P1 to P3, the cross-sectional image of each region is divided into a plurality of areas (e.g., at 0.1 μm intervals) from the surface side toward the metal core portion side of the anode body, along a path parallel to the thickness direction of the anode body, to calculate an average of the porosities in each area thus divided, which can be determined as the porosities P1 to P3. A schematic cross-sectional view of the second electrode foil having the dielectric layer is similar to that of FIG. 1, and the porosities Q1 to Q3 can be similarly determined.

The porosities P1, P2, and P3 in the first region R1, the second region R2, and the third region R3 may further satisfy P1/P2<P3/P2. Likewise, in the second electrode foil having the dielectric layer, Q1/Q2<Q3/Q2 may be satisfied. In this case, the porosity increases at a higher rate on the surface side of the anode body than in the deep portion, rather than increasing at a fixed rate from the metal core portion toward the surface of the anode body. Therefore, the diffusion of the dielectric layer source gas can be effectively facilitated in the first region R1, while in the third region R3, it is possible to ensure a surface area that can sufficiently enhance the capacitance.

The P1 to P3 may satisfy P2/P1<P3/P2, may satisfy 1.05·P2/P1<P3/P2, and may satisfy 1.3·P2/P1<P3/P2. Likewise, the Q1 to Q3 may satisfy Q2/Q1<Q3/Q2, may satisfy 1.05·Q2/Q1<Q3/Q2, and may satisfy 1.3·Q2/Q1<Q3/Q2.

The P1 may be, for example, 30% or more. The P2 may be, for example, 40% or more, and may be 50% or more. The P3 may be 60% or more. In view of ensuring a sufficient strength of the first electrode foil (anode body), the P3 is preferably 80% or less, the P2 is preferably 70% or less, and the P1 is preferably 60% or less. Likewise, the Q1 may be, for example, 30% or more. The Q2 may be, for example, 40% or more, and may be 50% or more. The Q3 may be 60% or more. In view of ensuring a sufficient strength of the second electrode foil, the Q3 is preferably 80% or less, the Q2 is preferably 70% or less, and the Q1 is preferably 60% or less.

When the P1 to P3 are in the ranges above, in the case of forming a dielectric layer in a liquid phase like chemical formation (anodization), a chemical formation solution can easily permeate into the deep portion of the metal porous portion. In the case of forming a dielectric layer by a vapor phase method like an atomic layer deposition method, the diffusion of the dielectric layer source gas can be further facilitated. In view of ensuring a sufficient strength of the first electrode foil and the second electrode foil, the P3 or Q3 is preferably 80% or less, the P2 or Q2 is preferably 70% or less, and the P1 or Q1 is preferably 60% or less.

The thickness of the metal porous portion is not limited, and may be selected as appropriate depending on the use of the electrolytic capacitor, the required withstand voltage, and the like. The thickness of the metal porous portion can be selected from the range of, for example, 10 μm to 160 μm. The thickness of the metal porous portion is, for example, 1/10 or more and 5/10 or less of the thickness of the first or second electrode foil. The thickness T of the metal porous portion can be determined by cutting the first or second electrode foil to obtain a cross-section of the metal core portion and the metal porous portion in their thickness direction, photographing an electron micrograph of the cross-section, and averaging the thicknesses at 10 random points in the metal porous portion.

The pore diameter peak of the pits or pores of the metal porous portion is not limited, but in view of increasing the surface area and forming the dielectric layer in the deep portion of the metal porous portion, the pore diameter peak is set to, for example, 50 nm to 2000 nm, and may be set to 100 nm to 300 nm. The pore diameter peak is the most frequent pore size in a volumetric pore size distribution as measured with, for example, a mercury porosimeter.

The withstand voltage of the electrolytic capacitor is not limited, and may be relatively low, for example, 1 V or more and below 4 V, and may be relatively high, for example, 4 V or more, 15 V or more, or 100 V or more. In the case of obtaining an electrolytic capacitor having a withstand voltage of 4 V or more, the dielectric layer is preferably formed in a thickness of 4 nm or more. In the case of obtaining an electrolytic capacitor having a withstand voltage of 15 V or more, the dielectric layer is preferably formed in a thickness of 21 nm or more.

Specifically, in the case of obtaining an electrolytic capacitor having a high withstand voltage of, for example, 60 V or more, the pore diameter peak in the metal porous portion may be, for example, 50 to 300 nm, the thickness of the metal porous portion may be, for example, 30 to 160 μm, and the thickness of dielectric layer may be, for example, 30 to 100 nm.

In an electrolytic capacitor having a withstand voltage of, for example, 100 V or more, the etched pit shape may be an approximate columnar, conical or circular truncated cone shape that extends like a tunnel from the surface side of the anode body toward the metal core portion side, with the pit diameter being large on the surface side of the anode body and small on the metal core portion side.

In the case of obtaining an electrolytic capacitor having a relatively low withstand voltage of, for example, 10 V or less, the pore diameter peak of the metal porous portion may be, for example, 20 to 200 nm, the thickness of the metal porous portion may be, for example, 30 to 160 μm, and the thickness of the dielectric layer may be, for example, 4 to 30 nm.

The first metal may include, for example, Al. In this case, the second metal may include at least one selected from the group consisting of Ta, Nb, Ti, Si, Zr, and Hf.

In the dielectric layer, an oxide of the first metal may be provided between the metal part containing the first metal and the oxide of the second metal. In the following, of the dielectric layer, a portion where an oxide containing the second metal is formed is sometimes referred to as a first layer, and a portion where an oxide containing the first metal is formed is sometimes referred to as a second layer.

For example, an oxide containing the second metal (first layer) may be formed on a natural oxide film of the first metal formed on the surface of the metal part. After the first layer is formed on the natural oxide film, the metal portion may be anodized, so that an oxide of the first metal oxide (second layer) having a desired thickness is formed between the metal part and the oxide containing the second metal (first layer).

The second layer may contain a composite oxide of the oxide of the first metal and the oxide of the second metal. With the presence of the second layer, even when the first layer has a defect, the defect can be repaired. Thus, the performance of the dielectric layer can be further improved.

The thickness T1 of the first layer and the thickness T2 of the second layer, in at least the third region, may satisfy T1≥2·T2, and may satisfy T1≥3·T2. By forming the first layer in a relatively large thickness as above, when, for example, selecting a second metal having a high dielectric constant, the capacitance of the electrolytic capacitor can be significantly improved. According to the above structure of the metal porous portion, the source gas can easily reach a deeper portion, and T1>T2 can be satisfied in the first region, too.

The thickness of the first layer and the second layer can be determined by cutting the anode body to obtain a cross-section of the metal porous portion in its thickness direction, photographing an electron micrograph of the cross-section, and averaging the thicknesses at 10 random points in the first or second layer.

The first layer preferably contains at least one additive element selected from the group consisting of C, P, B, and N. The additive element is preferably distributed from the surface of the first layer to at least a depth of 0.05·T1 (thickness of the first layer). This makes it possible to impart sufficient acid resistance to the dielectric layer and to sufficiently reduce the leakage current. The first layer is formed of a dielectric containing an oxide of a second metal different from the first metal. The second metal can form a dielectric having a high dielectric constant, but in the course of its formation, a defect which can be a cause of an increase in leakage current is likely to occur in the dielectric layer. The entry of the additive element into the defect can impart acid resistance to the dielectric layer, and thus can suppress the increase in leakage current. In the electrolytic capacitor according to the present embodiment, the above element can be efficiently added to the dielectric layer.

A description will be given below of a method of producing a first electrode foil.

The first electrode foil is produced by, for example, a method including a process of preparing a metal foil, and a roughening process of surface-roughening the metal foil, to form a metal porous portion. The roughening process includes an etching process of etching the metal foil. By surface-roughening, a metal porous portion having a plurality of pits or pores is formed on the surface side of the metal foil. Simultaneously, a metal core portion continuous to the metal porous portion is formed in the inner portion of the metal foil. The etching may be, for example, a DC etching with a direct current or an AC etching with an alternating current.

The etching conditions are set such that when the metal porous portion is equally divided in three in its thickness direction into a first region, a second region, and a third region sequentially from the metal core portion side, the first region has a porosity P1, the second region has a porosity P2, and the third region has a porosity P3, satisfying P1<P2<P3. Specifically, for example, by applying a predetermined AC current to an aluminum foil or an aluminum alloy foil in an etching solution mainly composed of, for example, hydrochloric acid, the porosities P1, P2, and P3 can be set as desired.

The roughening process may include an etching process of applying an electric current to a metal foil, to etch the metal foil. The current is applied to the metal foil such that, for example, the current density decreases gradually on average. The actual shift of the current density may be continuous or stepwise. As the etching process proceeds, the metal porous portion is gradually formed in the metal foil.

Here, that "the current density decreases gradually on average" means that when the relationship between the time for which the current is applied to a metal foil and the current density is approximated by a curve or straight line, the approximate curve or straight line has a negative slope (i.e., the shift rate of the current density is negative). An approximate equation corresponding to the approximate curve or straight line may be of a linear function or of a quadratic or higher-order function. When the correlation coefficient of the approximate expression is denoted by R, however, the determination coefficient $R^2$ is preferably in the range of 0.75 or more and 0.99 or less, more preferably 0.82 or more and 0.99 or less, or 0.85 or more and 0.99 or less. The approximate curve is desirably a downward convex curve.

In the case where a relatively high chemical formation voltage is to be applied when forming a dielectric layer on the first electrode foil after the first electrode is prepared (e.g., in the case where the chemical formation voltage is 60 V or more (or 100 V or more), the current density applied when preparing a first metal foil is desirably gradually decreased linearly. This can form relatively large pores in the metal porous portion. On the other hand, in the case where a relatively low chemical formation voltage is to be applied when forming a dielectric layer on the first electrode foil (e.g., in the case where the chemical formation voltage is below 60 V (or 10 V or less), the current density applied when preparing a first metal foil is desirably gradually decreased quadratically or along a downward convex curve. This can form relatively small pores in the metal porous portion.

In the etching step, it is desirable to apply an electric current intermittently to the metal foil. Specifically, in the etching step, desirably, a period of time during which an electric current is applied to the metal foil (hereinafter sometimes referred to as an electrolysis time) and a period of time during which no current is applied (hereinafter sometimes referred to as a non-electrolysis time) are each repeated twice or more. It should be noted that a period of time during which a slight current (e.g., 1% or less of the below-described first current density or 0.001 A/cm² or less) flows to the metal foil may be included in the non-electrolysis time during which no current is applied. For example, in an etching process by a roll-to-roll system using a production line having a plurality of etching tanks, rollers for conveying the metal foil are installed near the bottom of the etching tanks. While the metal foil is in contact with the rollers and before and after the contact, the current flowing to the metal foil decreases. This period of time may be included in the non-electrolysis time.

During the electrolysis time, the ionic species of the metal element constituting the metal foil tend to be concentrated in the pits or pores under formation in the metal foil. In order to perform efficient etching, it is effective to substantially stop the application of an electric current temporally to allow the ionic species to diffuse, rather than applying an electric current steadily to the metal foil to allow the ionic species to grow. By intermittently providing the non-electrolysis time, the diffusion of the ionic species of the metal element is facilitated, and the concentration of the ionic species in the pits or pores is reduced, making more efficient etching possible.

When the period of time from the start to the end (at the end of the last electrolysis time) of the etching process is denoted by T0, the total electrolysis time during which an electric current is applied to the metal foil is denoted by T1, and the total non-electrolysis time during which no current is applied to the metal foil is denoted by T2, T0=T1+T2. The total electrolysis time T1 may be, for example, 10 to 70% of T0, and may be 30 to 70%. The non-electrolysis time may be used for washing the metal foil and other treatments. That is, the non-electrolysis time may be a washing step of washing the metal foil. In the washing period, the metal foil may be introduced into a washing liquid in a washing tank, or the metal foil may be washed with a shower of washing liquid or with running water.

The time T0 from the start to the end of the etching process and the total electrolysis time T1 during which an electric current is applied to the metal foil are not limited, and may be set as appropriate depending on the thickness of the first electrode foil, the desired depth of the etched pits, and others. The time T0 may be, for example, 16 min or more and 70 min or less. The electrolysis time T1 may be, for example, 7 min or more and 50 min or less.

The non-electrolysis time may be provided in any way. For example, in the non-electrolysis time, the metal foil may be impregnated with any of the processing solutions (e.g., etching solution, washing liquid), or may not be impregnated with the processing solution. For example, when a region where the metal foil and the anode electrode come opposed to each other is provided intermittently in one etching tank, and etching is performed while the metal foil and the anode electrode are opposed to each other, the period of time during which the metal foil and the anode electrode are not opposed to each other is the non-electrolysis time. In this case, the metal foil is present in the processing solution even in at least part of the non-electrolysis time.

On the other hand, when etching is performed by a roll-to-roll system using a production line having a plurality of etching tanks, an outside path through which a predetermined length of the metal foil is conveyed outside the etching tank can be provided between a pair of adjacent etching tanks. In this case, the period during which the metal foil is conveyed on the outside path is the non-electrolysis time, and the metal foil passes through the outside path where no processing solution is present, in at least part of the non-electrolysis time.

The processing solution includes those for various purposes, but those mainly used here are an etching solution for applying an electric current to the metal foil for surface roughening, a washing liquid for washing the metal foil, and the like. In particular, washing the metal foil is effective in facilitating the diffusion of the ionic species of the metal element to be dissolved during etching by electrolysis.

As the etching solution, for example, an aqueous hydrochloric acid solution is preferable, and an aqueous solution containing, in addition to hydrochloric acid, sulfuric acid, nitric acid, phosphoric acid, oxalic acid, or the like is also used. The aqueous solution may further contain one or more various additives, such as a chelating agent. The concentration of the hydrochloric acid, the concentration of another acid, and the temperature of the etching solution are not particularly limited, and may be set as appropriate depending on the desired shape of the etched pits, and performance of the capacitor. The concentration of the hydrochloric acid in the etching solution is, for example, 1 mol/L or more and 10 mol/L or less. The concentration of another acid in the etching solution is, for example, 0.01 mol/L or more and 1 mol/L or less. The temperature of the etching solution during the electrolytic etching process is not limited, and is, for example, 15° C. or higher and 60° C. or lower.

The washing liquid may be water (ion-exchanged water), but when washing is the main purpose, it is preferable to complete washing in a short time using an aqueous solution containing a soluble acid, such as hydrochloric acid, phosphoric acid, dilute sulfuric acid, and oxalic acid. When water is used for washing the metal foil, impurities are easily removed, and the ionic species can be easily diffused. In this case, a washing step of 10 s or more, or 20 s or more, and even 60 s or more may be performed. By protecting the surface of the metal foil, the etching in the deep portion of the metal foil can be allowed to proceed effectively.

The etching process may include, for example: a first electrolysis step of immersing a metal foil in a first processing solution, and applying an electric current of a first current density to the metal foil; a second electrolysis step of immersing the metal foil (first etched foil) in a second processing solution, and applying an electric current of a second current density to the metal foil; and a third electrolysis step of immersing the metal foil (second etched foil) in a third processing solution after the second electrolysis step, and applying an electric current of a third current density to the metal foil. The following relationship may be satisfied: the first current density> the second current density> the third current density. Here, the first, the second, and the third current density means an average current density in the first, the second, and the third electrolysis step, respectively. The average current density can be calculated using the integrated value of the current applied to the metal foil during each electrolysis time, and the period of each electrolysis time.

Of the time T0 from the start to the end of the etching process, the first electrolysis step may occupy 0.2·T0 to 0.4·T0, the second electrolysis step may occupy 0.2·T0 to 0.4·T0, and the third electrolysis step may occupy 0.2·T0 to 0.4·T0. The first electrolysis step, the second electrolysis step, and the third electrolysis step may occupy 0.7·T0 or more in total. In each electrolysis step, the electrolysis period may be intermittent and may include a non-electrolysis time.

After the first electrolysis step and before the second electrolysis step, a first washing step of washing the metal foil (first etched foil) may be performed. After the second electrolysis step and before the third electrolysis step, a second washing step of washing the metal foil (second etched foil) may be further performed. Here, the first electrolysis step and the second electrolysis step are each ended with the electrolysis time, and shifted to the first or second washing step which is a non-electrolysis time. As mentioned above, the first and second electrolysis steps may each further include a non-electrolysis time in its process. The non-electrolysis time may include a washing step other than the first and second washing steps. Note that the first and second washing steps are separate steps from the first to third electrolysis steps.

The processing solution (i.e., the washing liquid) used in the first washing step and the second washing step may be an aqueous dilute acid solution as described above, and may be a solution containing hydrochloric acid, phosphoric acid, dilute sulfuric acid, oxalic acid, and the like.

The first processing solution, for example, may be mainly composed of hydrochloric acid, and contain aluminum, sulfuric acid, phosphoric acid and/or nitric acid. The first current density may be, for example, 0.20 to 0.25 A/cm$^2$, and the total of the electrolysis time in the first electrolysis step may be, for example, 1 to 10 min, and the total of the non-electrolysis time may be, for example, 1 to 10 min. After the first electrolysis step and before the second electrolysis step, the metal foil (first etched foil) may be taken out from the first processing solution and washed with a washing liquid.

The second processing solution, for example, may be mainly composed of hydrochloric acid, and contain aluminum, sulfuric acid, phosphoric acid and/or nitric acid. The second current density may be, for example, 0.19 to 0.24 A/cm$^2$, and the total of the electrolysis time in the second electrolysis step may be, for example, 1 to 10 min, and the total of the non-electrolysis time may be, for example, 1 to 10 min. After the second electrolysis step and before the third electrolysis step, the metal foil (second etched foil) may be taken out from the second processing solution and washed with a washing liquid.

The third processing solution, for example, may be mainly composed of hydrochloric acid, and contain aluminum, sulfuric acid, phosphoric acid and/or nitric acid. The third current density may be, for example, 0.18 to 0.23 A/cm$^2$, and the total of the electrolysis time in the third electrolysis step may be, for example, 1 to 10 min, and the total of the non-electrolysis time may be, for example, 1 to 10 min. After the third electrolysis step, the metal foil (third or first electrode foil) may be taken out from the third processing solution and further washed with a washing liquid.

In the above examples, the concentration of the hydrochloric acid being the main component of the processing solution may be the same or different among in the first, second, and third processing solutions.

According to the method as described above, it is easy to obtain a first electrode foil in which when the metal porous portion is equally divided in three in a thickness direction of the metal porous portion into a first region, a second region, and a third region sequentially from the metal core portion side, the first region has a porosity P1, the second region has a porosity P2, and the third region has a porosity P3, satisfying P1<P2<P3.

Next, a description will be given below of a method of producing a second electrode foil and an electrolytic capacitor.

The second electrode foil is produced by, for example, a method including processes: (i) preparing an anode body (first electrode foil) having a metal porous portion and a metal core portion continuous to the metal porous portion; and (ii) forming a dielectric layer covering a surface of a metal part constituting the metal porous portion. The electrolytic capacitor is produced by a method including the above processes (i) and (ii) and further including a process (iii) of forming a cathode section covering the dielectric layer.

Process (i)

The process (i) of preparing an anode body (first electrode foil) is, for example, a process of etching a metal foil containing a first metal, to surface-roughen the metal foil. In this process, a first electrode foil in which the porosity P1 of the first region, the porosity P2 of the second region, and the porosity P3 of the third region satisfy P1<P2<P3 is prepared. When P1<P2<P3, in the case of forming a dielectric layer by chemical formation (anodization), the chemical formation solution can easily permeate deep into the metal porous portion, and in the case of forming a dielectric layer by a gas phase method, the source gas and the like can easily enter deep into the metal porous portion. Therefore, a favorable dielectric layer can be formed even in the deep portion of the metal porous portion.

The first metal is not limited to a specific kind, but is preferably a valve action metal, such as aluminum (Al), tantalum (Ta), and niobium (Nb), or an alloy containing a valve action metal, in view of the ease of formation of a dielectric layer or second layer by chemical formation. The metal foil may have any thickness, but is, for example, 15 μm or more and 300 μm or less thick.

Process (ii)

The process (ii) of forming a dielectric layer may be, for example, a process of subjecting the anode body (first electrode foil) to chemical formation (anodization). For example, by applying a voltage to the first electrode foil while being immersed in a chemical formation solution, such as an ammonium adipate solution, an ammonium phosphate solution, and an ammonium borate solution, a second electrode foil having the dielectric layer formed on a surface of a metal part can be obtained.

The process (ii) of forming a dielectric layer may be, for example, a process of depositing an oxide of a second metal different from the first metal contained in the metal part, by a vapor phase method, on the surface of the metal part, to form a first layer having a thickness T1. Thus, a second electrode foil having a dielectric layer formed on a surface of the metal portion is obtained.

Examples of the second metal include Al, Ta, Nb, silicon (Si), titanium (Ti), zirconium (Zr), and hafnium (Hf). These may be used singly or in combination of two or more kinds. That is, in the first layer, $Al_2O_3$, $Ta_2O_5$, $Nb_2O_5$, $SiO_2$, $TiO_2$, $ZrO_2$, $HfO_2$, and the like may be included singly or in combination of two or more kinds. When the first layer contains two or more oxides of the second metal, the two or more oxides may be present in a mixed state, or each of them present in a layer. In view of increasing the capacitance of the electrolytic capacitor, the oxide of the second metal preferably has a dielectric constant higher than that of the oxide of the first metal. In view of improving the withstand voltage of the electrolytic capacitor, the second metal is preferably Ta, Ti, Si, or the like.

Examples of the gas phase method include a vacuum deposition method, a chemical vapor deposition method, a mist vapor deposition method, a sputtering method, a pulse laser deposition method, and an atomic layer deposition method (ALD method). In particular, the ALD method is excellent in that it can form a dense dielectric layer even in the deep portion of the metal porous portion. The first layer may have any thickness, and may be, for example, 0.5 nm or more and 200 nm or less thick, and may be 5 nm or more and 200 nm or less thick.

Figure 2:
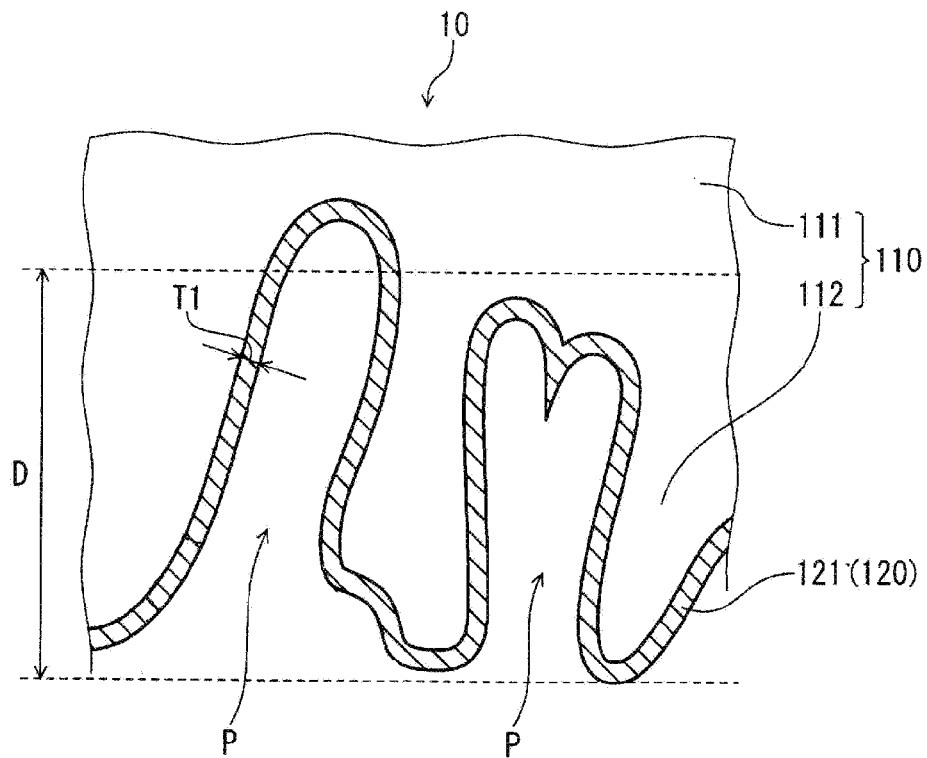
FIG. 2 A partially enlarged schematic cross-sectional view of a porous portion having a dielectric layer according to one embodiment of the present invention.

An example of an anode foil 10 is shown in FIG. 2, which includes an anode body 110 being an integrally formed body of a metal core portion 111 and a metal porous portion 112, and a dielectric layer 120 covering a surface of a metal part constituting the metal porous portion 112. FIG. 2 is a partially enlarged schematic cross-sectional view of the metal porous portion 112 having a first layer 121 only, as the dielectric layer 120.

The metal porous portion 112 has a number of pits (or pores) P surrounded by the metal part. The dielectric layer 120 (first layer 121) is provided so as to cover at least part of the surface of the metal part. The first layer 121 contains an oxide of a second metal different from the first metal contained in the metal part, and its thickness is denoted by T1.

The ALD method is a film forming method in which a second metal-containing source gas and an oxidant are alternately supplied into a reaction chamber with an object placed therein, so that a dielectric layer (first layer) containing an oxide of the second metal can be formed on a surface of the object. According to the ALD method that allows self-limiting film growth, the second metal can deposit on the atomic level on a surface of the object. Therefore, by controlling the number of cycles each consisting of: raw material gas supply-> raw material gas purge-> oxidant supply-> oxidant purge, the thickness of the first layer can be controlled. In short, the ALD method can easily control the thickness of the dielectric layer to be formed.

In contrast to a CVD which is typically carried out under a temperature condition of 400 to 900° C., the ALD method can be carried out under a temperature condition of 100 to 400° C. In short, the ALD method is excellent in that it can suppress the thermal damage to the metal foil.

Examples of the oxidant used in the ALD method include water, oxygen, and ozone. The oxidant may be supplied into the reaction chamber, as a plasma produced from the oxidant.

The second metal is supplied into the reaction chamber, as a gas of a precursor containing the second metal. The precursor is, for example, an organic metal compound containing the second metal. By supplying as above, the second metal can be easily chemically adsorbed onto the object. As the precursor, various organic metal compounds used conventionally for the ALD method can be used.

Examples of a precursor containing Al include trimethyl aluminum (($CH_3)_3Al$). Examples of a precursor containing Zr include bis(methyl-η5-cyclopentadienyl) methoxymethyl zirconium ($Zr(CH_3C_5H_4)_2CH_3OCH_3$), tetrakis(dimethylamide) zirconium(IV) ($[(CH_3)_2N]_4Zr$), tetrakis(ethylmethylamide) zirconium(IV) ($Zr(NCH_3C_2H_5)_4$), and zirconium(IV) t-butoxide ($Zr[OC(CH_3)_3]_4$). Examples of a precursor containing Nb include niobium(V) ethoxide ($Nb(OCH_2CH_3)_5$, tris (diethylamide)(t-butylimide) niobium(V) ($C_{16}H_{39}N_4Nb$).

Examples of a precursor containing Ta include (t-butyl-imide)tris(ethylmethylamino) tantalum(V) ($C_{13}H_{33}N_4Ta$, TBTEMT), tantalum(V) pentaethoxide ($Ta(OC_2H_5)_5$), (t-butylimide)tris(diethylamino) tantalum(V) (($CH_3)_3CNTa(N(C_2H_5)_2)_3$), and pentakis(dimethylamino) tantalum(V) ($Ta(N(CH_3)_2)_5$).

Examples of a precursor containing Nb include niobium (V) ethoxide ($Nb(OCH_2CH_3)_5$), and tris(diethylamide)(t-butylimide) niobium(V) ($C_{16}H_{39}N_4Nb$).

Examples of a precursor containing Si include N-sec-butyl(trimethylsilyl)amine ($C_7H_{19}NSi$), 1,3-diethyl-1,1,3,3-tetramethyldisilazane ($C_8H_{23}NSi_2$), 2,4,6,8,10-pentamethyl-cyclopentasiloxane (($CH_3SiHO)_5$), pentamethyldisilane (($CH_3)_3SiSi(CH_3)_2H$), tris(isopropoxy)silanol ($[(H_3C)_2CHO]_3SiOH$), chloropentanedimethyldisilane (($CH_3)_3SiSi(CH_3)_2Cl$), dichlorosilane ($SiH_2Cl_2$), tridimethylaminosilane (($Si[N(CH_3)_2]_4$), tetraethylsilane ($Si(C_2H_5)_4$), tetramethylsilane ($Si(CH_3)_4$), tetraethoxysilane ($Si(OC_2H_5)_4$), dodecamethylcyclohexasilane (($Si(CH_3)_2)_6$), silicon tetrachloride ($SiCl_4$), and silicon tetrabromide ($SiBr_4$).

Examples of a precursor containing Ti include bis(t-butylcyclopentadienyl) titanium(IV) dichloride ($C_{18}H_{26}C_{12}Ti$), tetrakis(dimethylamino) titanium(IV) ($[(CH_3)_2N]_4Ti$, TDMAT), tetrakis(diethylamino) titanium (IV) ($[(C_2H_5)_2N]_4Ti$), tetrakis(ethylmethylamino) titanium (IV) ($Ti[N(C_2H_5)(CH_3)]_4$), titanium(IV) (diisopropoxide-bis(2,2,6,6-tetramethyl-3,5-heptanedionate) ($Ti[OCC(CH_3)_3CHCOC(CH_3)_3]_2(OC_3H_7)_2$), titanium tetrachloride ($TiCl_4$), titanium(IV) isopropoxide ($Ti[OCH(CH_3)_2]_4$), and titanium (IV) ethoxide ($Ti[O(C_2H_5)]_4$).

Examples of a precursor containing Zr include bis (methyl-$\eta^5$cyclopentadienyl) methoxymethyl zirconium (Zr $(CH_3C_5H_4)_2CH_3OCH_3$), tetrakis(dimethylamide) zirconium (IV) ($[(CH_3)_2N]_4Zr$), tetrakis(ethylmethylamide) zirconium (IV) ($Zr(NCH_3C_2H_5)_4$), and zirconium(IV) t-butoxide (Zr $[OC(CH_3)_3]_4$).

Examples of a precursor containing Hf include hafnium tetrachloride ($HfCl_4$), tetrakisdimethylamino hafnium ($Hf[N(CH_3)_2]_4$), tetrakisethylmethylamino hafnium ($Hf[N(C_2H_5)(CH_3)]_4$), tetrakisdiethylamino hafnium ($Hf[N(C_2H_5)_2]_4$), and hafnium-t-butoxide ($Hf[OC(CH_3)_3]_4$).

The method of producing a second electrode foil may further include a process of subjecting the anode body with the oxide of the second metal deposited thereon (i.e., the anode body having the first layer) to chemical formation (anodization). This can form a second layer of a thickness T2 containing an oxide of the first metal can be formed between the metal part containing the first metal and the oxide of the second metal (first layer). The thickness T2 can be controlled by the voltage applied to the anode body during the chemical formation.

As described above, when the porosity P1 of the deepest portion (first region) of the etched pits is small, a favorable dielectric layer can be efficiently formed even in the deepest portion. When the porosity P3 of the surface layer portion (third region) of the etched pits is large, the entry of the source gas is facilitated, and the source gas can easily reach the deepest portion. As a result, the ratio of the first layer to the second layer can be easily controlled high even in the first region, and a dielectric layer having a high dielectric constant can be formed throughout the metal porous portion.

In the case where at least one additive element selected from the group consisting of C, P, B, and N is to be contained in the first layer, for example, after the anode body having the dielectric layer is immersed in an aqueous solution containing the additive element(s), the anode body may be subjected to a heat treatment (e.g., heated to 180° C. or higher). The additive element may be attached to the anode body having the dielectric layer, by a vapor phase method, such as vapor deposition. In order to facilitate the diffusion of the additive element, the heating temperature of the heat treatment is set to 250° C. or higher.

The aqueous solution containing the additive element may be an aqueous solution of a compound containing the additive element. Examples of the compounds include: a carboxylic acid containing C (carbon), such as oxalic acid, malonic acid, adipic acid, succinic acid, glutaric acid, sebacic acid, and tartaric acid; a compound containing N (nitrogen) like an ammonium salt, such as diammonium adipate; a compound containing P (phosphorus), such as phosphoric acid, ammonium phosphate, phosphonic acid, and phosphinic acid; and a compound containing B (boron), such as boric acid and ammonium borate.

Figure 3:
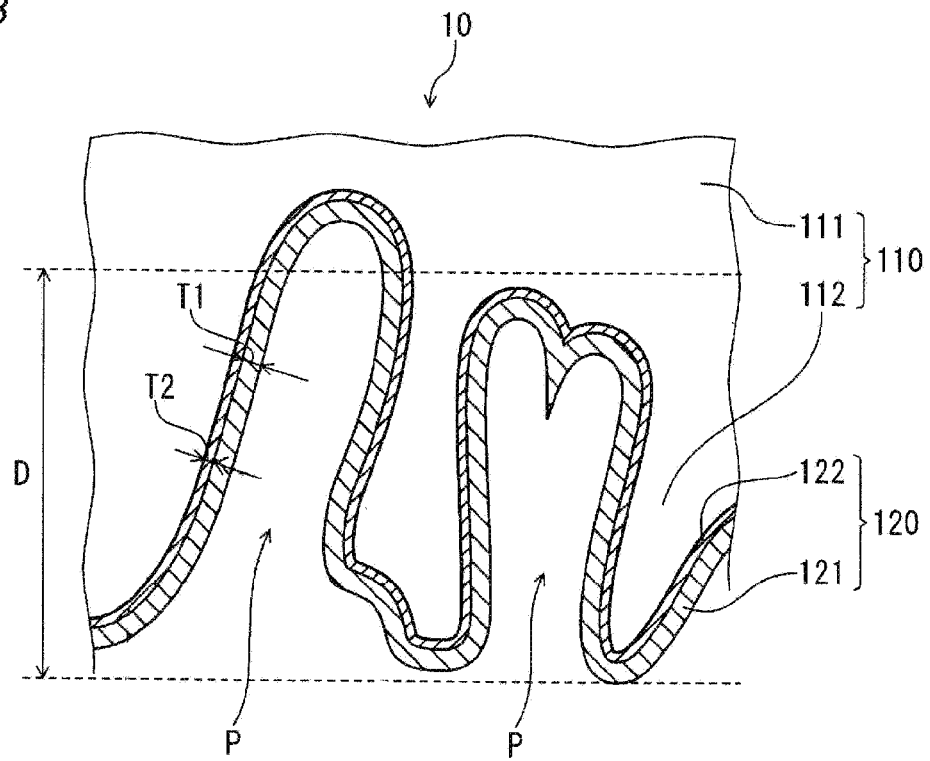
FIG. 3 A partially enlarged schematic cross-sectional view of a porous portion having a dielectric layer according to another embodiment of the present invention.

FIG. 3 is a partially enlarged schematic cross-sectional view of a metal porous portion 112 having, as a dielectric layer 120, a first layer 121 and a second layer 122. The dielectric layer 120 has the second layer 122 and the first layer 121 sequentially from the metal part side. The thickness of the first layer 121 is denoted by T1, and the thickness of the second layer is denoted by T2.

According to the ALD method, a thin and uniform dielectric layer (first layer) can be formed. However, practically, there may be a defect, such as pinholes, on the surface of the deep portion of the pits included in the metal porous portion. When forming a second layer, the ionized first metal diffuses into the first layer and acts to repair the defect in the first layer. Consequently, a dielectric layer having a uniform thickness and being free of pinholes is formed as a whole. Therefore, the capacitance of the electrolytic capacitor is increased, the withstand voltage is improved, and the leakage current is reduced.

The thickness T2 of the second layer is not limited, but may be smaller than the thickness T1 of the first layer. The thickness T2 of the second layer is, for example, 0.5 nm or more and 200 nm or less, and may be 5 nm or more and 200 nm or less.

The ratio of the thickness T1 of the first layer to the thickness T2 of the second layer is not limited, and may be set as appropriate depending on the use, the desired effect, and others. For example, at least in the third region, the ratio of the thickness: T1/T2 may be 2 or more, may be 3 or more, and may be 5 or more.

Process (iii)

In the process (iii) of forming a cathode section covering the dielectric layer, for example, an electrolytic solution is impregnated into the anode body having the dielectric layer, and/or a solid electrolyte layer is formed on a surface of the dielectric layer. When the formation of a solid electrolyte layer and the impregnation of an electrolytic solution are both performed, after a solid electrolyte layer is formed on the dielectric layer, the impregnation of an electrolytic solution is performed.

The electrolytic solution may be a non-aqueous solvent, and may be a mixture of a non-aqueous solvent and an ionic substance (a solute (e.g., an organic salt)) dissolved therein. The non-aqueous solvent may be an organic solvent or an ionic liquid.

A preferable non-aqueous solvent is a high boiling point solvent. Examples thereof include: polyvalence alcohols, such as ethylene glycol and propylene glycol; cyclic sulfones, such as sulfolane; lactones, such as γ-butyrolactone; amides, such as N-methylacetamide, N,N-dimethylformamide, and N-methyl-2-pyrrolidone; esters, such as methyl acetate; carbonate compounds, such as propylene carbonate; ethers, such as the 1,4-dioxane; ketones, such as methyl ethyl ketone; and formaldehyde.

In the organic salt, at least one of the anion and the cation contains an organic material. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate.

The solid electrolyte layer contains, for example, a manganese compound, a conductive polymer, and the like. Examples of the conductive polymer include polypyrrole, polythiophene, polyaniline, and derivatives thereof. The solid electrolyte layer containing a conductive polymer can be formed, for example, by chemically polymerizing and/or electrolytically polymerizing a raw material monomer on the dielectric layer. The solid electrolyte layer may be formed by attaching a solution or dispersion of a conductive polymer on the dielectric layer.

Figure 5:
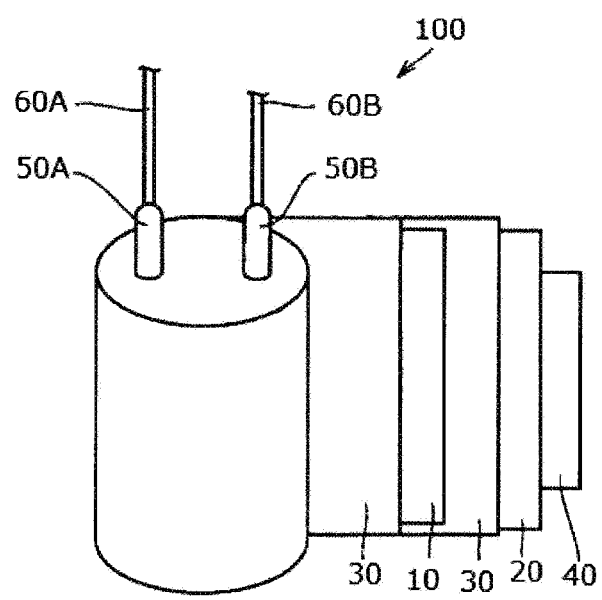
FIG. 5 A schematic oblique view showing a configuration of a wound body included in the electrolytic capacitor.

When the anode body having the dielectric layer is an anode foil as illustrated in FIGS. 1 to 3, prior to forming a cathode section, a wound body 100 as illustrated in FIG. 5 may be fabricated. FIG. 5 is an exploded diagram showing a configuration of the wound body 100.

In the case of fabricating the wound body 100, in addition to the anode foil 10, a cathode foil 20 is prepared. Likewise for the anode foil 10, a metal foil can be used for the cathode foil 20. The metal constituting the cathode foil 20 is not limited to a specific kind, but may a valve action metal, such as Al, Ta, and Nb, or an alloy containing a valve action metal. The cathode foil 20 may be surface-roughened, if necessary.

Next, the anode foil 10 and the cathode foil 20 are wound, with a separator 30 interposed therebetween. One end of a lead tab 50A or 50B is connected to the anode foil 10 and the cathode foil 20, respectively, and the wound body 100 is formed by winding together with the lead tabs 50A and 50B. To the other ends of the lead tabs 50A are 50B, lead wires 60A and 60B are connected, respectively.

The separator 30 is not limited, and may be, for example, a nonwoven fabric mainly composed of cellulose, polyethylene terephthalate, vinylon, aramid fiber, or the like.

Next, a winding stop tape 40 is disposed on the outer surface of the cathode foil 20 positioned at the outermost layer of the wound body 100, to secure the end of the cathode foil 20 with the winding stop tape 40. When the anode foil 10 is prepared by cutting from a large-sized foil, in order to provide a dielectric layer on the cut surface, chemical formation may be applied to the wound body 100.

The method of impregnating the wound body 100 with a liquid for forming electrolyte is not limited. The liquid for forming electrolyte is, for example, an electrolytic solution, a solution of a conductive polymer, and/or a dispersion of a conductive polymer. For example, the wound body 100 may be immersed into an electrolytic solution, solution, or dispersion contained in a container, or alternatively, an electrolytic solution, solution, or dispersion may be dropped onto the wound body 100.

The impregnation may be carried out under reduced pressure, for example, in an atmosphere of 10 kPa to 100 kPa, preferably 40 kPa to 100 kPa. When P1<P2<P3 or Q1<Q2<Q3, even when the viscosity of the liquid for forming electrolyte is 10 mPa·s or more, particularly as high as 50 mPa·s or more, or 100 mPa·s or more, the permeability of the liquid for forming electrolyte into the metal porous portion can be enhanced, and the capacitance achievement rate of the electrolytic capacitor can be also increased, and this acts advantageously on the reduction of ESR and the suppression of leakage current.

Figure 4:
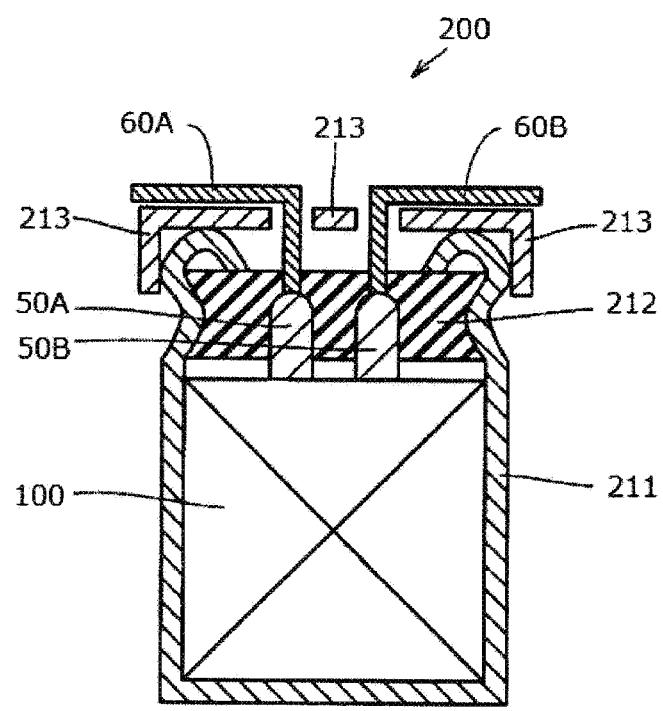
FIG. 4 A schematic cross-sectional view of an electrolytic capacitor.

Next, by sealing the wound body 100, an electrolytic capacitor 200 as illustrated in FIG. 4 can be obtained. To produce the electrolytic capacitor 200, first, the wound body 100 is housed in a bottomed case 211, with the lead wires 60A and 60B positioned on the opening side of the bottomed case 211. The material of the bottomed case 211 may be a metal, such as aluminum, stainless steel, copper, iron, and brass, or an alloy thereof.

Next, a sealing member 212 with the lead wires 60A and 60B passing therethrough is arranged above the wound body 100, so that the wound body 100 is sealed in the bottomed case 211. The sealing member 212 may be made of any material that is electrically insulative, and preferably made of an elastic body. Particularly preferred are those having high heat resistance, such as silicone rubber, fluorocarbon rubber, ethylene propylene rubber, Hypalon rubber, butyl rubber, and isoprene rubber.

Next, a lateral drawing is applied to the bottomed case 211 near the end of its opening, and the opening end is crimped onto the sealing member 212 and curled. Lastly, a seat plate 213 is placed at the curled portion, to complete the sealing. This may be followed by an aging treatment performed under application of a rated voltage.

Figure 6:
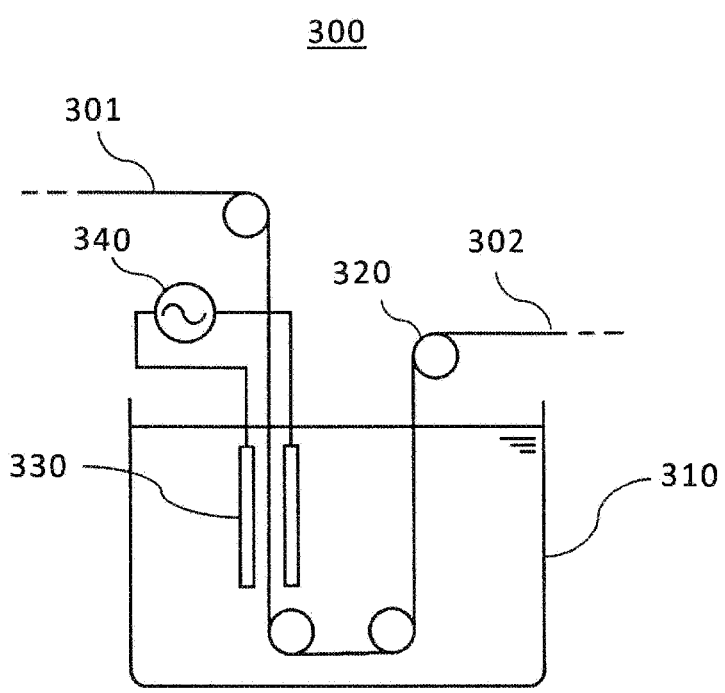
FIG. 6 A schematic explanatory diagram illustrating part of an etching apparatus used in a roughening process according to one embodiment of the present invention.

FIG. 6 is a schematic explanatory diagram illustrating an etching apparatus used in an etching process by a roll-to-roll system. An etching apparatus 300 includes: an etching tank 310 for holding an etching solution; a plurality of conveyor rollers 320 for conveying the metal foil 301; a pair of electrodes 330 facing the metal foil 301; and an AC power source 340 for supplying an electric current to the electrodes 330. The metal foil 301 is conveyed via the plurality of conveyor rollers 320 and moves within the etching tank 310. The metal foil 301 is etched while facing the electrodes 330 in the etching tank 310 (during the electrolysis time). This provides a metal foil (etched foil) 302 that has been partially etched.

In FIG. 6, etching is performed on the continuous metal foil 301, but is not limited thereto. For example, etching may be performed on a stationary-placed metal foil having a certain area. In FIG. 6, etching is performed using a pair of electrodes, but is not limited thereto. For example, etching may be performed, with the metal foil faced to one electrode, by connecting the electrode and the metal foil to an AC power source. Furthermore, two or more etching tanks may be included. Two or more pairs of electrodes may be set in one etching tank.

Although the above embodiment describes a wound electrolytic capacitor, the scope of application of the present invention is not limited thereto, and is applicable to other electrolytic capacitors, such as a laminated electrolytic capacitor.

The present invention will be described below in more detail with reference to Examples, but the present invention is not limited to Examples.

Example 1A

In the present example, after a first layer was formed as a dielectric layer by an ALD method, chemical formation at a voltage 65 V was performed to produce a second electrode foil (chemically formed foil). The production method will be specifically described below.
(Preparation of Anode Body (First Electrode Foil))

A 150-μm-thick Al foil was prepared as a metal foil. The Al foil was pretreated with an aqueous hydrochloric acid solution, and then subjected to an etching process performed by applying an AC current in an etching solution containing hydrochloric acid as a main component. The etching current (current density, frequency), the etching time, and the etching solution temperature were adjusted as appropriate, so that an etched foil (first electrode foil) was obtained in which a metal porous portion having a thickness of 55 μm and having the following porosity was formed at both surfaces of the Al foil.

The pore diameter peak of the metal porous portion was 170 nm. The porosity P1 of the first region R1, the porosity P2 of the second region R2, and the porosity P3 of the third region R3 were 55%, 62%, and 75%, respectively, satisfying P1<P2<P3. Also, P2/P1=1.13, and P3/P2=1.21, satisfying P2/P1<P3/P2.

Figure 7:
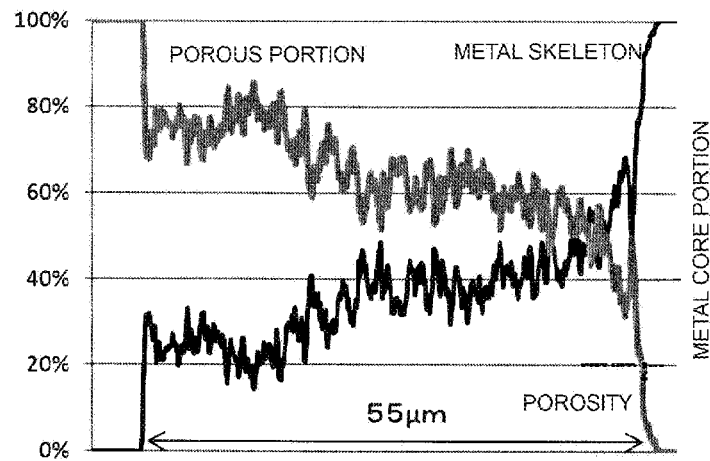
FIG. 7 A graph showing a relationship between the distance from the surface of an anode body and the porosity (Al remaining ratio) in a metal porous portion according to Example 1A of the present invention.

FIG. 7 shows a relationship between the distance from the surface of the anode body and the porosity (Al remaining ratio) in the metal porous portion.
(Preparation of Second Electrode Foil)

Next, an oxide containing Ta was formed as a dielectric layer (first layer) on the surface of the Al skeleton (metal part) constituting the porous portion, by an ALD method (temperature: 200° C., precursor: (t-butylimide)tris(ethylmethylamino) tantalum(V) ($C_{13}H_{33}N_4Ta$, TBTEMT), oxidant: $H_2O$, pressure: 10 Pa, 3000 cycles).

Subsequently, chemical formation was applied to the Al foil (the first electrode foil having the first layer), to form a second layer containing an oxide of Al between the Al skeleton and the first layer. A second electrode foil was thus obtained. In the chemical formation, the Al foil having the first layer was immersed in an aqueous diammonium adipate solution (ammonium adipate concentration: 10 mass %) and applied with a DC current, and after a chemical formation voltage of about 65 V was reached, held for about 10 min. After washed with water, the foil was heated in air at 300° C. for 5 min. The second electrode foil thus obtained was cut into a predetermined shape.

The elemental analysis showed that the first layer (thickness: approx. 80 nm) contained $Ta_2O_5$, and the second layer (thickness: approx. 10 nm) contained $Al_2O_3$ (T1=8·T2).

Comparative Example 1A

A 150-μm-thick Al foil was used, and the etching current (current density, frequency), the etching time, and the etching solution temperature were adjusted as appropriate, so that an etched foil (first electrode foil) was obtained in which a metal porous portion having a thickness of 55 μm and having the following porosity was formed at both surfaces of the Al foil. The pore diameter peak of the metal porous portion was 165 nm. The porosity P1 of the first region R1, the porosity P2 of the second region R2, and the porosity P3 of the third region R3 were 51%, 49%, and 52%, respectively, failing to satisfy P1<P2<P3. A second electrode foil was prepared and evaluated in the same manner as in Example 1A, except that the anode body (first electrode foil) thus formed was used.
[Evaluation]

The obtained second electrode foil was measured for its capacitance and leakage current. The leakage current was determined as an integrated value of the leakage current that was measured, by applying a voltage at an increase rate of 0.2 V/s until the voltage reached 60 V, after the foil was immersed in a 35° C. aqueous acidic solution for 60 min. Table 1 shows relative values of Example 1A against the results of Comparative Example 1A, which are taken as 100.

Example 1B

A second electrode foil (chemically formed foil) having a dielectric layer containing $Al_2O_3$ was prepared by performing chemical formation at a voltage of 65 V on the etched foil (first electrode foil) obtained in Example 1A, without performing the formation of a first layer by an ALD method, and evaluated similarly to the above.

In the chemical formation, the first electrode foil was immersed in an aqueous diammonium adipate solution (ammonium adipate concentration: 10 mass %) and applied with a DC current, and after a chemical formation voltage of about 65 V was reached, held for about 10 min. After washed with water, the foil was heated in air at 300° C. for 5 min. The second electrode foil thus obtained was cut into a predetermined shape.

Comparative Example 1B

A second electrode foil (chemically formed foil) having a dielectric layer containing $Al_2O_3$ was prepared by performing chemical formation at a voltage of 65 V as in Example 1B on the etched foil (first electrode foil) obtained in Comparative Example 1A, without performing the formation of a first layer by an ALD method, and evaluated similarly to the above.

Table 1 shows relative values of Example 1B against the results of Comparative Example 1B, which are taken as 100.

Example 2

A 120-μm-thick Al foil was used, and the etching current (current density, frequency), the etching time, and the etching solution temperature were adjusted as appropriate, so that an etched foil (first electrode foil) was obtained in which a metal porous portion having a thickness of 40 μm and having the following porosity was formed at both surfaces of the Al foil. The porosity P1 of the first region R1, the porosity P2 of the second region R2, and the porosity P3 of the third region R3 were 50%, 55%, and 70%, respectively, satisfying P1<P2<P3. Also, P2/P1=1.10, and P3/P2=1.27, satisfying P2/P1<P3/P2. A second electrode foil was prepared and evaluated in the same manner as in Example 1A, except that the anode body (first electrode foil) thus formed was used.

Figure 8:
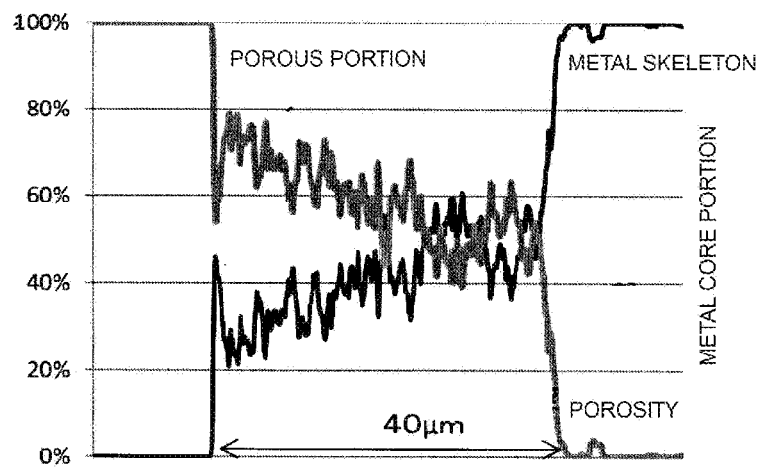
FIG. 8 A graph showing a relationship between the distance from the surface of an anode body and the porosity (Al remaining ratio) in a metal porous portion according to Example 2 of the present invention.

FIG. 8 shows a relationship between the distance from the surface of the anode body and the porosity (Al remaining ratio) in the metal porous portion of Example 2.

Example 3

A second electrode foil (chemically formed foil) having a dielectric layer containing $Al_2O_3$ was prepared by performing chemical formation at a voltage of 65 V as in Example 1B on the etched foil (first electrode foil) obtained in Example 2, without performing the formation of a first layer by an ALD method, and evaluated similarly to the above.

Comparative Example 2

A 120-μm-thick Al foil was used, and the etching current (current density, frequency), the etching time, and the etching solution temperature were adjusted as appropriate, so that an etched foil (first electrode foil) was obtained in which a metal porous portion having a thickness of 40 μm and having the following porosity was formed at both surfaces of the Al foil. The porosity P1 of the first region R1, the porosity P2 of the second region R2, and the porosity P3 of the third region R3 were 55%, 50%, and 52%, respectively, failing to satisfy P1<P2<P3. Except that the anode body (first electrode foil) thus formed was used, a second electrode foil was prepared in the same manner as in Example 3 by performing chemical formation on the first electrode foil only, without performing the formation of a first layer by an ALD method, and evaluated similarly to the above.

Figure 9:
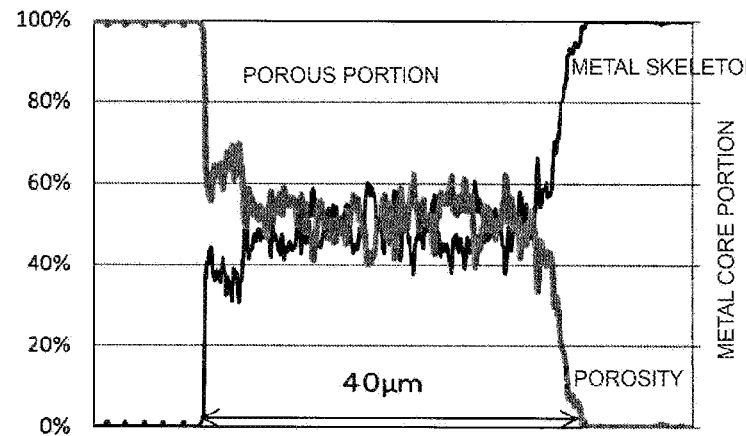
FIG. 9 A graph showing a relationship between the distance from the surface of an anode body and the porosity (Al remaining ratio) in a metal porous portion according to Comparative Example 2 of the present invention.

FIG. 9 shows a relationship between the distance from the surface of the anode body and the porosity (Al remaining ratio) in the metal porous portion of Comparative Example 2.

Table 1 shows relative values of Examples 2 and 3 against the results of Comparative Example 2, which are taken as 100.

TABLE 1

|  | Capacitance | Leakage current |
| --- | --- | --- |
| Ex. 1A | 115% | 83% |
| Com. Ex. 1A | 100% | 100% |
| Ex. 1B | 109% | 93% |
| Com. Ex. 1B | 100% | 100% |
| Ex. 2 | 119% | 74% |
| Ex. 3 | 108% | 93% |
| Com. Ex. 2 | 100% | 100% |

In Examples 1A and 1B, as compared to Comparative Examples 1A and 1B, the capacitance was improved, and the leakage current was reduced. Further, in Examples 2 and 3, as compared to Comparative Example 2, the capacitance was improved and the leakage current was reduced.

Example 4

A 150-μm-thick Al foil was prepared as the metal foil, and subjected to the following etching process. The current density is shown as a value relative to the first current density in the first electrolysis step, which is taken as 100%.

<First Electrolysis Step>

The Al foil was pretreated with an aqueous hydrochloric acid solution, and then, applied with an AC current of the following profile, in an etching solution containing hydrochloric acid as a main component.

Electrolysis time: Current density 100%, 5 min (Step 1 in FIG. 10)

<First Washing Step>

Non-electrolysis time: Washing with pure water for 8 min

<Second Electrolysis Step>

The Al foil having subjected to the first step (etched foil) was applied with an AC current of the following profile, in an etching solution containing hydrochloric acid as a main component.

Electrolysis time: Current density 93%, 5 min (Step 2 in FIG. 10)

<Second Washing Step>

Non-electrolysis time: Washing with pure water for 8 min

<Third Electrolysis Step>

The Al foil having subjected to the second step (second etched foil) was applied with an AC current of the following profile, in an etching solution (electrolytic solution) containing hydrochloric acid as a main component.

Electrolysis time: Current density 90.7%, 5 min (Step 3 in FIG. 10)

<Third Washing Step>

Non-electrolysis time: Washing with pure water for 8 min

T1=15 min

T2=16 min

T0=T1+T2=31 min

As a result of the above, a first electrode foil was obtained in which a metal porous portion having a thickness of 40 μm and having the following porosity was formed at both surfaces of the Al foil. The pore diameter peak of the metal porous portion was 170 nm. The porosity P1 of the first region R1, the porosity P2 of the second region R2, and the porosity P3 of the third region R3 satisfied P1<P2<P3, and P2/P1<P3/P2.

Figure 10:
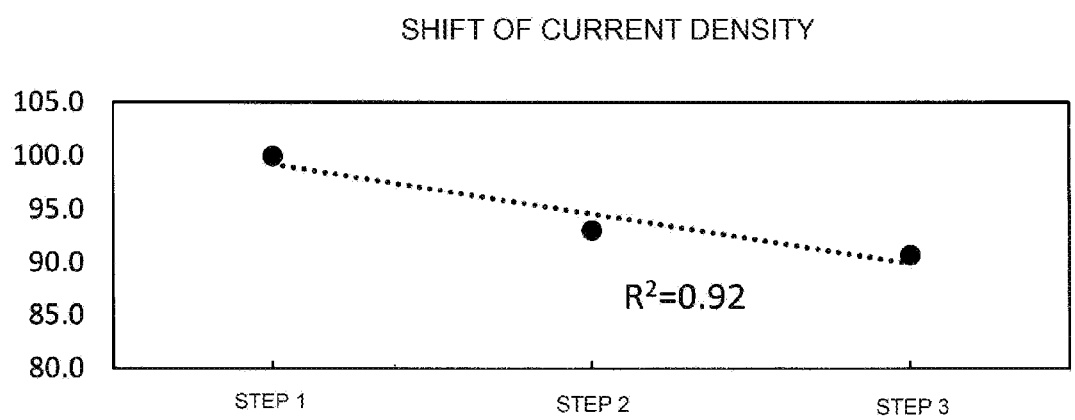
FIG. 10 A diagram showing a shift of the current density in an etching process according to one embodiment of the present invention.

FIG. 10 shows plots representing a shift of the current density in the etching process and an approximate straight line thereof. The determination coefficient $R^2$ of the approximate straight line is 0.92.

Example 5

A 120-μm-thick Al foil was prepared as the metal foil, and subjected to the following etching process. The current density is shown as a value relative to the first current density in the first sub-step of the first electrolysis step, which is taken as 100%.
<First Electrolysis Step>
The Al foil was pretreated with an aqueous hydrochloric acid solution, and then, applied with an AC current of the following profile, in an etching solution containing hydrochloric acid as a main component.
    (i) First sub-step (Step 1 in FIG. 11)
    Electrolysis time: Current density 100%, 3 min
    Non-electrolysis time: Washing with pure water for 8 min
    (ii) Second sub-step (Step 2 in FIG. 11)
    Electrolysis time: Current density 94.8%, 3 min
<First Washing Step>
Non-electrolysis time: Washing with pure water for 8 min
<Second Electrolysis Step>
The Al foil having subjected to the first electrolysis step (first etched foil) was applied with an AC current of the following profile, in an etching solution (electrolytic solution) containing hydrochloric acid as a main component.
    (i) First sub-step (Step 3 in FIG. 11)
    Electrolysis time: Current density 95.4%, 3 min
    Non-electrolysis time: Washing with pure water for 8 min
    (ii) Second sub-step (Step 4 in FIG. 11)
    Electrolysis time: Current density 92.3%, 3 min
<Second Washing Step>
Non-electrolysis time: Washing with pure water for 8 min
<Third Electrolysis Step>
The Al foil having subjected to the second electrolysis step (second etched foil) was applied with an AC current of the following profile, in an etching solution containing hydrochloric acid as a main component.
    (i) First sub-step (Step 5 in FIG. 11)
    Electrolysis time: Current density 93.1%, 3 min
    Non-electrolysis time: Washing with pure water for 8 min
    (ii) Second sub-step (Step 6 in FIG. 11)
    Electrolysis time: Current density 90.5%, 3 min
<Third Washing Step>
Non-electrolysis time: Washing with pure water for 8 min
T1=18 min
T2=40 min
T0=T1+T2=58 min As a result of the above, a first electrode foil was obtained in which a metal porous portion having a thickness of 40 μm and having the following porosity was formed at both surfaces of the Al foil. The pore diameter peak of the metal porous portion was 170 nm. The porosity P1 of the first region R1, the porosity P2 of the second region R2, and the porosity P3 of the third region R3 were 50%, 55%, and 70%, respectively, satisfying P1<P2<P3. Also, P2/P1=1.10, and P3/P2=1.27, satisfying P2/P1<P3/P2.

Figure 11:
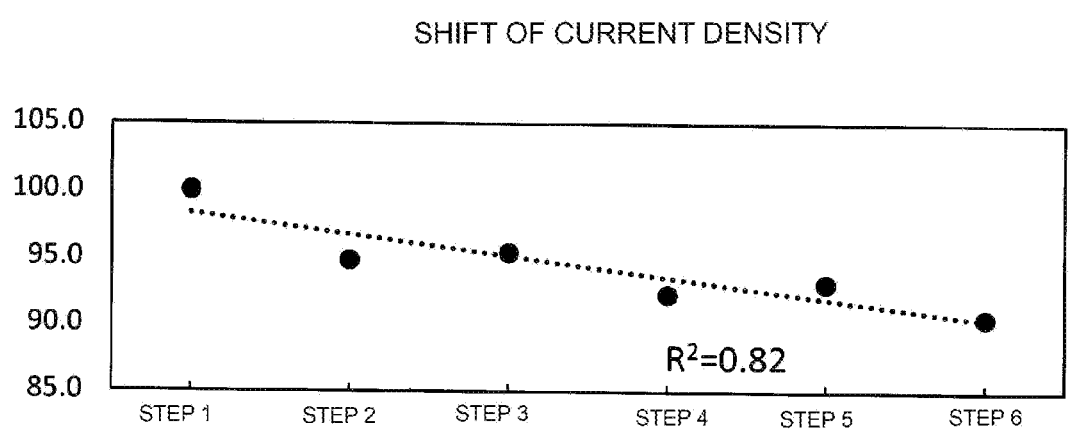
FIG. 11 A diagram showing a shift of the current density in an etching process according to another embodiment of the present invention.

FIG. 11 shows plots representing a shift of the current density in the etching process and an approximate straight line thereof. The determination coefficient $R^2$ of the approximate straight line is 0.82.

Example 6

A 150-μm-thick Al foil was prepared as the metal foil, and subjected to the following etching process. The current density is shown as a value relative to the first current density in the first sub-step of the first electrolysis step, which is taken as 100%.
<First Electrolysis Step>
The Al foil was pretreated with an aqueous hydrochloric acid solution, and then, applied with an AC current of the following profile, in an etching solution containing hydrochloric acid as a main component.
    (i) First sub-step (Step 1 in FIG. 12)
    Electrolysis time: Current density 100%, 3 min
    Non-electrolysis time: Washing with pure water for 8 min
    (ii) Second sub-step (Step 2 in FIG. 12)
    Electrolysis time: Current density 94.8%, 3 min
<First Washing Step>
Non-electrolysis time: Washing with pure water for 8 min
<Second Electrolysis Step>
The Al foil having subjected to the first electrolysis step (first etched foil) was applied with an AC current of the following profile, in an etching solution containing hydrochloric acid as a main component.
    (i) First sub-step (Step 3 in FIG. 12)
    Electrolysis time: Current density 95.4%, 3 min
    Non-electrolysis time: Washing with pure water for 8 min
    (ii) Second sub-step (Step 4 in FIG. 12)
    Electrolysis time: Current density 92.3%, 3 min
<Second Washing Step>
Non-electrolysis time: Washing with pure water for 8 min
<Third Electrolysis Step>
The Al foil having subjected to the second electrolysis step (second etched foil) was applied with an AC current of the following profile, in an etching solution (electrolytic solution) containing hydrochloric acid as a main component.
    (i) First sub-step (Step 5 in FIG. 12)
    Electrolysis time: Current density 93.1%, 3 min
    Non-electrolysis time: Washing with pure water for 8 min
    (ii) Second sub-step (Step 6 in FIG. 12)
    Electrolysis time: Current density 90.5%, 3 min
<Third Washing Step>
Non-electrolysis time: Washing with pure water for 8 min
T1=18 min
T2=40 min
T0=T1+T2=58 min As a result of the above, a first electrode foil was obtained in which a metal porous portion having a thickness of 55 μm and having the following porosity was formed at both surfaces of the Al foil. The pore diameter peak of the metal porous portion was 170 nm. The porosity P1 of the first region R1, the porosity P2 of the second region R2, and the porosity P3 of the third region R3 were 55%, 62%, and 75%, respectively, satisfying P1<P2<P3. Also, P2/P1=1.13, and P3/P2=1.21, satisfying P2/P1<P3/P2.

Figure 12:
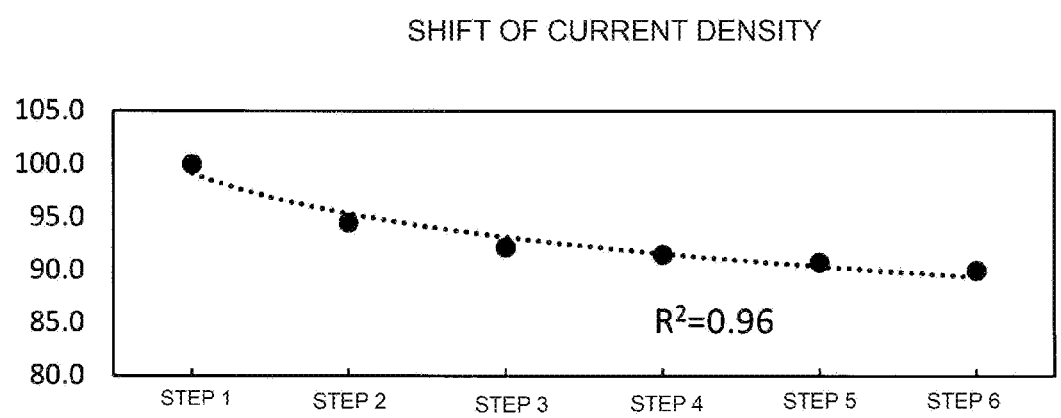
FIG. 12 A diagram showing a shift of the current density in an etching process according to yet another embodiment of the present invention.

FIG. 12 shows plots representing a shift of the current density in the etching process and an approximate straight line thereof. The determination coefficient $R^2$ of the approximate straight line is 0.96.

Example 7

A 150-μm-thick Al foil was prepared, and subjected to the following etching process having nine sub-steps, in one electrolysis tank. The current density is shown as a value relative to the first current density in the first sub-step, which is taken as 100%.

The Al foil was pretreated with an aqueous hydrochloric acid solution, and then, applied with an AC current of the following profile, in an etching solution (electrolytic solution) containing hydrochloric acid as a main component.

(i) First sub-step (Step 1 in FIG. 13)
Electrolysis time: Current density 100%, 3 min
Non-electrolysis time: Washing with pure water for 8 min
(ii) Second sub-step (Step 2 in FIG. 13)
Electrolysis time: Current density 93.4%, 3 min
Non-electrolysis time: 8 min
(iii) Third sub-step (Step 3 in FIG. 13)
Electrolysis time: Current density 95.8%, 3 min
Non-electrolysis time: 8 min
(iv) Fourth sub-step (Step 4 in FIG. 13)
Electrolysis time: Current density 88.2%, 3 min
Non-electrolysis time: 8 min
(v) Fifth sub-step (Step 5 in FIG. 13)
Electrolysis time: Current density 87.2%, 3 min
T1=15 min
T2=32 min
T0=T1+T2=47 min As a result of the above, a first electrode foil was obtained in which a metal porous portion having a thickness of 40 μm and having the following porosity was formed at both surfaces of the Al foil. The pore diameter peak of the metal porous portion was 170 nm. The porosity P1 of the first region R1, the porosity P2 of the second region R2, and the porosity P3 of the third region R3 satisfied P1<P2<P3, and P2/P1<P3/P2.

Figure 13:
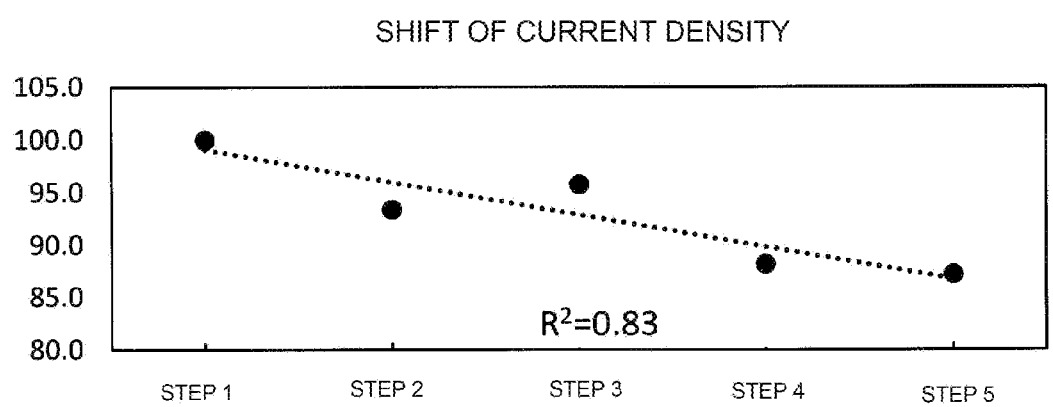
FIG. 13 A diagram showing a shift of the current density in an etching process according to still another embodiment of the present invention.

FIG. 13 shows plots representing a shift of the current density in the etching process and an approximate straight line thereof. The determination coefficient $R^2$ of the approximate straight line is 0.83.

INDUSTRIAL APPLICABILITY

According to the present invention, for example, a dielectric layer can be formed even in the deep portion of the metal porous portion, and therefore, the performance of the electrolytic capacitor can be improved.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10: anode foil, 20: cathode foil, 30: separator, 40: winding stop tape, 50A, 50B: lead tab, 60A, 60B: lead wire, 100: wound body, 110: anode body, 111: metal core portion, 112: metal porous portion, 120: dielectric layer, 121: first layer, 122: second layer, 200: electrolytic capacitor, 211: bottomed case, 212: sealing member, 213: seat plate

The invention claimed is:

1. An electrode foil for an electrolytic capacitor, comprising:
   a metal porous portion; and a metal core portion continuous to the metal porous portion, wherein
   when the metal porous portion is equally divided in three in a thickness direction of the metal porous portion into a first region, a second region, and a third region sequentially from the metal core portion side, the first region has a porosity P1, the second region has a porosity P2, and the third region has a porosity P3, satisfying P1<P2<P3 and P2/P1<P3/P2.

2. The electrode foil for an electrolytic capacitor according to claim 1, wherein the P1 is 60% or less.

3. The electrode foil for an electrolytic capacitor according to claim 1, wherein the P2 is 70% or less.

4. The electrode foil for an electrolytic capacitor according to claim 1, wherein the P3 is 80% or less.

5. The electrode foil for an electrolytic capacitor according to claim 1, further comprising a dielectric layer covering at least part of a surface of a metal part constituting the metal porous portion.

6. An electrolytic capacitor, comprising:
   the electrode foil for an electrolytic capacitor of claim 5; and
   a cathode section covering at least part of the dielectric layer.

7. The electrolytic capacitor according to claim 6, wherein
   the cathode section includes a conductive polymer, and
   the conductive polymer is impregnated into the first region.

8. The electrolytic capacitor according to claim 6, wherein
   the cathode section includes an electrolytic solution, and
   the electrolytic solution is impregnated into the first region.

9. A method for producing an electrode foil for an electrolytic capacitor, the method comprising:
   a process of preparing a metal foil; and
   a roughening process of surface-roughening the metal foil, to form a metal porous portion,
   the roughening process including an etching process of applying an electric current to the metal foil,
   the etching process having:
   a first electrolysis step of applying an electric current of a first current density to the metal foil in a first processing solution, to obtain a first etched foil;
   a second electrolysis step of applying an electric current of a second current density to the first etched foil in a second processing solution after the first electrolysis step, to obtain a second etched foil;
   a third electrolysis step of applying an electric current of a third current density to the second etched foil in a third processing solution after the second electrolysis step, to obtain a third etched foil;
   a first washing step of washing the first etched foil with a first washing liquid, after the first electrolysis step and before the second electrolysis step; and
   a second washing step of washing the second etched foil with a second washing liquid, after the second electrolysis step and before the third electrolysis step, wherein:
   at least one of the first or second washing liquids is an aqueous dilute acid solution containing at least one selected from the group consisting of hydrochloric acid, phosphoric acid, dilute sulfuric acid, and oxalic acid, and
   the first current density>the second current density>the third current density.

10. The method for producing an electrode foil for an electrolytic capacitor according to claim 9, wherein when the metal porous portion is equally divided in three in a thickness direction of the metal porous portion into a first region, a second region, and a third region sequentially from a metal core portion side, the first region has a porosity P1, the second region has a porosity P2, and the third region has a porosity P3, satisfying P1<P2<P3.

11. A method for producing an electrolytic capacitor, the method comprising:
the processes included in the method for producing an electrode foil for an electrolytic capacitor of claim 9; and
a process of forming a cathode section covering at least part of the dielectric layer.

12. An electrode foil for an electrolytic capacitor, comprising:
an anode body having a metal porous portion, and a metal core portion continuous to the metal porous portion; and
a dielectric layer covering at least part of a surface of a metal part constituting the metal porous portion, wherein:
the dielectric layer has a first layer of a thickness T1 containing an oxide of a second metal different from a first metal contained in the metal part, and
when the metal porous portion is equally divided in three in a thickness direction of the metal porous portion into a first region, a second region, and a third region sequentially from the metal core portion side, the first region has a porosity P1, the second region has a porosity P2, and the third region has a porosity P3, satisfying P1<P2<P3 and P2/P1<P3/P2.

13. The electrode foil for an electrolytic capacitor according to claim 12, wherein the P1 is 60% or less.

14. The electrode foil for an electrolytic capacitor according to claim 12, wherein the P2 is 70% or less.

15. The electrode foil for an electrolytic capacitor according to claim 12, wherein the P3 is 80% or less.

16. The electrode foil for an electrolytic capacitor according to claim 12, wherein the first metal includes Al, and the second metal incudes at least one selected from the group consisting of Ta, Nb, Ti, Si, Zr, and Hf.

17. The electrode foil for an electrolytic capacitor according to claim 12, having a second layer of a thickness T2 containing an oxide of the first metal, between the metal part and the first layer.

18. The electrode foil for an electrolytic capacitor according to claim 17, wherein T1>T2 in the first region.

19. The electrode foil for an electrolytic capacitor according to claim 12, wherein when the metal porous portion having the dielectric layer is equally divided in three into a first region, a second region, and a third region sequentially from the metal core portion, the first region has a porosity Q1, the second region has a porosity Q2, and the third region has a porosity Q3, satisfying Q1<Q2<Q3.

20. An electrolytic capacitor, comprising:
the electrode foil for an electrolytic capacitor of claim 12; and
a cathode section covering at least part of the dielectric layer.

21. An electrode foil for an electrolytic capacitor, comprising:
an anode body having a metal porous portion, and a metal core portion continuous to the metal porous portion; and
a dielectric layer covering at least part of a surface of a metal part constituting the metal porous portion, wherein
when the metal porous portion having the dielectric layer is equally divided in three in a thickness direction of the metal porous portion into a first region, a second region, and a third region sequentially from the metal core portion side, the first region has a porosity Q1, the second region has a porosity Q2, and the third region has a porosity Q3, satisfying Q1<Q2<Q3 and Q2/Q1<Q3/Q2.

22. A method for producing an electrode foil for an electrolytic capacitor, the method comprising processes of:
preparing an anode body having a metal porous portion, and a metal core portion continuous to the metal porous portion; and
forming a dielectric layer covering a surface of a metal part constituting the metal porous portion, wherein:
when the metal porous portion is equally divided in three in a thickness direction of the metal porous portion into a first region, a second region, and a third region sequentially from the metal core portion side, the first region has a porosity P1, the second region has a porosity P2, and the third region has a porosity P3, satisfying P1<P2<P3 and P2/P1<P3/P2, and
the process of forming a dielectric layer includes depositing an oxide of a second metal different from a first metal contained in the metal part, on a surface of the metal porous portion by a gas-phase method, to form a first layer of a thickness T1.

23. The method for producing an electrode foil for an electrolytic capacitor according to claim 22, wherein the process of forming a dielectric layer further includes subjecting the anode body having the first layer to chemical formation, to form a second layer of a thickness T2 containing an oxide of the first metal, between the metal part and the oxide of the second metal.

24. A method for producing an electrolytic capacitor, the method comprising:
the processes included in the method for producing an electrode foil for an electrolytic capacitor of claim 22; and
a process of forming a cathode section covering at least part of the dielectric layer.

* * * * *